United States Patent [19]
Hazelwood

[11] 3,966,040
[45] June 29, 1976

[54] COMBINED VIBRATORY FEEDER DRIVE UNIT, VIBRATORY FEEDER BOWL, AND PARTS SEPARATOR

[76] Inventor: John E. Hazelwood, R.R. 1, Shoreline Court 110 B, Noblesville, Ind. 46060

[22] Filed: Mar. 5, 1975

[21] Appl. No.: 555,451

[52] U.S. Cl............................. 198/288; 198/220 BC
[51] Int. Cl.² ........................................ B65G 47/42
[58] Field of Search ........... 221/156, 157, 224, 236, 221/225, 163; 198/220 BC, 220 CA, 220 CB, 220 CC, 220 DA, 220 DB, 220 DC, 250, 256, 288

[56] References Cited
UNITED STATES PATENTS

| | | | |
|---|---|---|---|
| 2,760,679 | 8/1956 | Chadderton et al. | 221/225 |
| 2,967,606 | 1/1961 | Peterson | 198/220 BC |
| 3,502,201 | 3/1970 | Spiess et al. | 198/220 CA |
| 3,599,783 | 8/1971 | Burgess, Jr. | 198/220 X |
| 3,788,449 | 1/1974 | Baberowski et al. | 198/220 BC |

Primary Examiner—Allen N. Knowles
Attorney, Agent, or Firm—Clarence A. O'Brien; Harvey B. Jacobson

[57] ABSTRACT

A combined vibratory feeder drive unit, vibratory feeder bowl, and parts separator receives springs and spring-like parts in bulk, unoriented, and tangled condition and untangles the springs and other parts and feeds them to an operator or automatic parts placing device. The parts separator is supported in a central opening in the bowl by a column arranged passing through the drive unit. Parts are fed from the separator into a pocket formed in the track of the vibratory bowl to prevent the parts from being retangled with other parts already on the track, while parts still tangled when fed from the separator will eventually be fed back into the separator until they become untangled and can be properly oriented by the track of the vibratory bowl.

10 Claims, 7 Drawing Figures

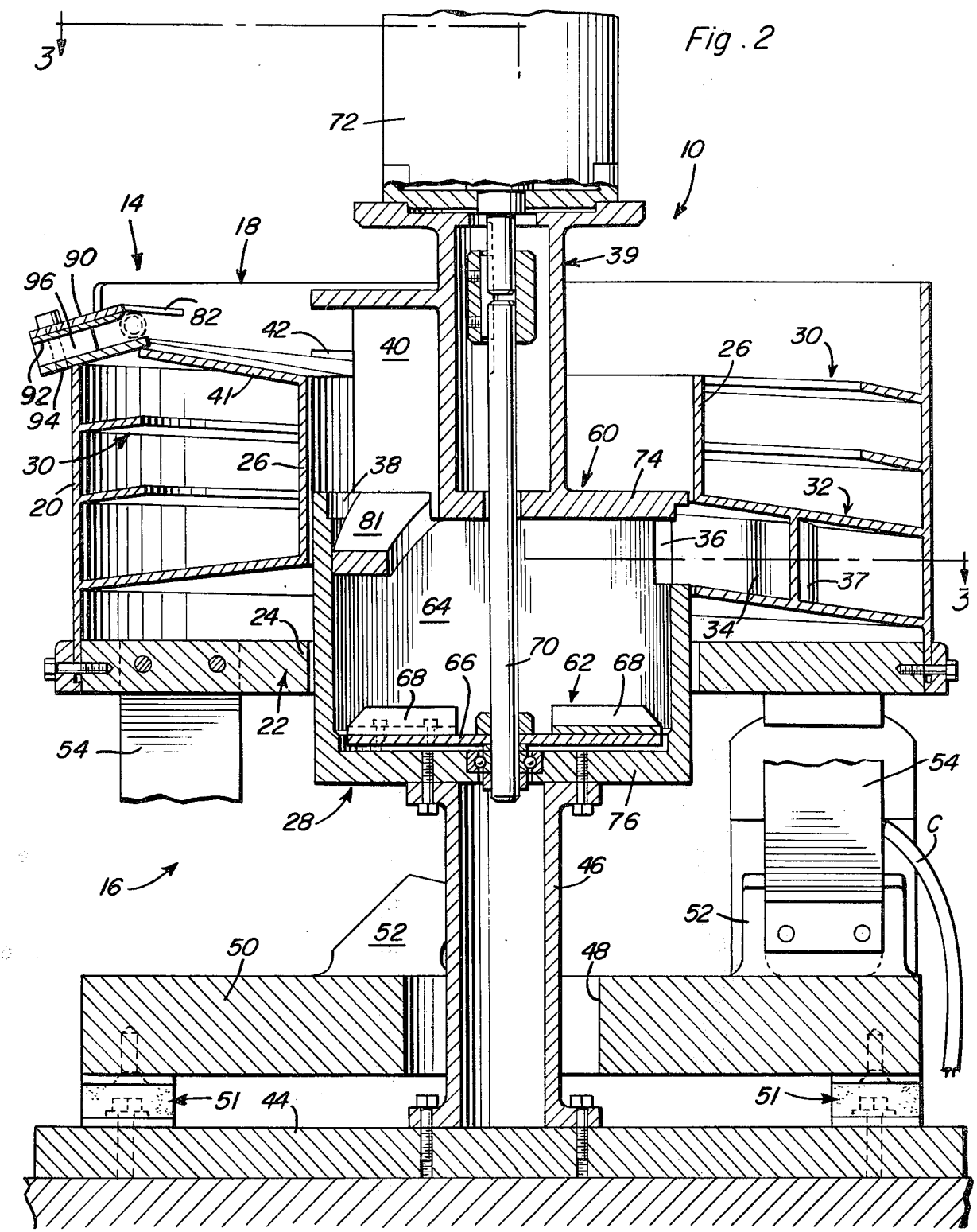

3,966,040

COMBINED VIBRATORY FEEDER DRIVE UNIT, VIBRATORY FEEDER BOWL, AND PARTS SEPARATOR

CROSS-REFERENCE TO A RELATED APPLICATION

The present invention is especially intended for use with a parts separator similar to the separator disclosed in my copending U.S. application Ser. No. 506,899, filed Sept. 17, 1974.

BACKGROUND OF THE INVENTION

1. Field of the Invention

This invention relates generally to separating and orienting apparatus, and particularly to a combined vibratory feeder drive unit, vibratory feeder bowl, and parts separator arranged for receiving springs and springlike parts in bulk, unoriented, and tangled condition and untangling the springs and other parts and subsequently orienting same.

2. Description of the Prior Art

Devices are known which take tangled articles such as springs, lamp filaments, and the like, and untangle and orient the articles so as to present same in a predetermined arrangement facilitating use of the articles in subsequent manufacturing operations. Examples of such prior art devices may be found in U.S. Pat. Nos. 2,760,679, issued Aug. 28, 1956 to J. J. Chadderton et al, and U.S. Pat. No. 3,042,181, issued July 3, 1962 to W. E. Rise. Basically, both of these prior art devices employ specially constructed housings combining the separator and feeding and orienting bowl into a single, integral unit. More specifically, U.S. Pat. No. 2,760,679 employs pneumatic power to separate tangled parts by arranging a mixing chamber of the separator directly beneath a vibratory bowl and blowing the parts up through the center of the bowl in a chute that acts to deflect the separated parts back into the feeder bowl for orientation. This technique of using a fluid flow to achieve separation of the parts is disadvantageous in that it is incapable of separating springs and springlike parts that are wound into each other. Further, the manner in which the parts are deflected into the feeder bowl may cause the parts to become reentangled, while the funnel passing upwardly through the feeder bowl could conceivably cause jamming problems. Patent No. 3,042,181 discloses a tangled spring separator wherein the springs and similar parts are fed into a vibratory bowl in which is arranged at a point spaced from the parts intake opening a multi-blade rotor. An inherent disadvantage to this known arrangement, however, is that the arrangement of the rotor within the feed bowl makes it possible for a part struck by the blade to strike other parts in the bowl and become re-entangled, as well as to strike parts on the track of the bowl and knock the already arranged parts on the track into the bottom of the bowl. Further, it is possible that the parts being untangled and oriented may become caught between the rotor and the bottom of the feeder bowl.

SUMMARY OF THE INVENTION

It is an object of the present invention to provide a parts separating and orienting device that overcomes the aforementioned disadvantages.

It is another object of the present invention to provide a parts separating and orienting device that permits employment of design techniques well known in the pertinent art.

These and other objects are achieved according to the present invention by providing apparatus for receiving articles such as springs and springlike parts in bulk and in unoriented and tangled condition and untangling and orienting same, the apparatus having: a parts separator assembly arranged for receiving tangled articles and separating same; a hopper arranged for orienting separated parts received from the separator, the separator being arranged centrally of and within the hopper; and a vibratory feeder drive unit connected to the hopper for imparting vibration to the hopper. Preferably, the hopper is an annular bowl which includes an outer wall and a bottom, with the latter being provided with a central opening, and an inner wall arranged around the opening. The outer and inner walls extend codirectionally from the bottom, and the separator assembly includes a separator unit arranged in the central opening of the bottom of the bowl. A support column mounted on a base of the drive unit is arranged extending centrally through the drive unit for supporting the separator unit in the central opening of the bottom of the bowl.

The bowl advantageously includes a spiral track extending toward the inner wall of the bowl from the outer wall thereof, with a portion of the track adjacent the bottom of the bowl extending from the outer wall to the inner wall and spirally more than one revolution around the bowl and forming a pocket. The separator unit has a discharge port disposed in communication with the pocket for decelerating parts emitted from the separator unit without the parts striking parts already in the bowl and becoming reentangled.

The bottom of the bowl is advantageously a spider provided with a central opening and having radially extending arms connected to spring members of the drive unit. Further, the counterweight of the drive unit, that being the member that supports the ends of the spring member spaced from the bottom of the bowl, also is advantageously provided with a hole that permits the separator unit supporting column to pass from the base of the drive unit through the counterweight as well as the spider to the separator unit.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a fragmentary, vertical sectional view taken transversely of FIG. 1.

DESCRIPTION OF THE PREFERRED EMBODIMENTS

Figure 1:
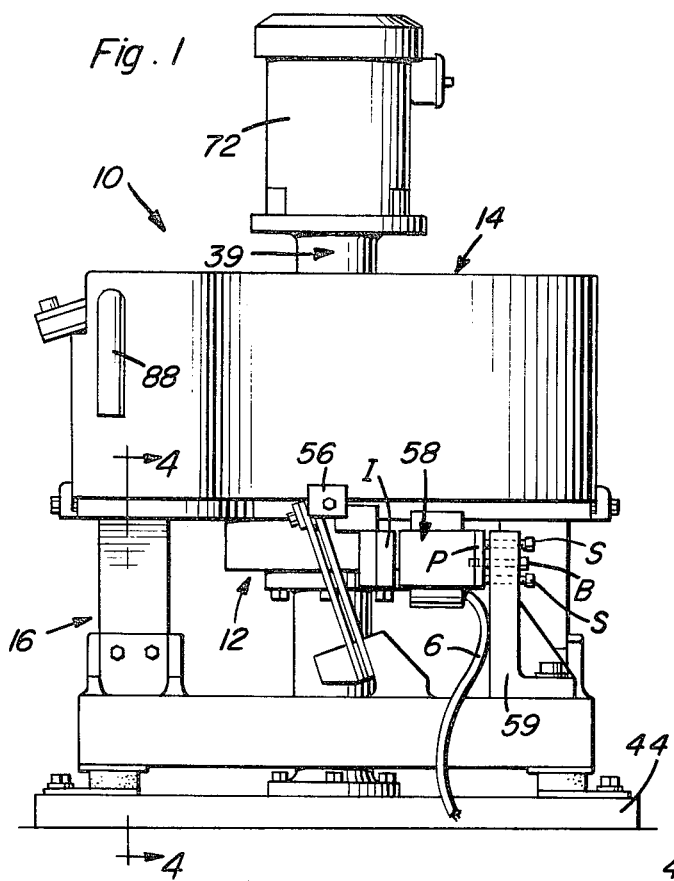
FIG. 1 is a side elevational view showing article separating and orienting apparatus according to the present invention.

Referring now more particularly to FIG. 1 of the drawings, an apparatus 10 according to the present invention is constructed for receiving articles such as springs and spring-like parts in bulk and in unoriented and tangled condition and untangling and orienting the articles. This apparatus includes a parts separator assembly 12 arranged for receiving tangled articles and separating same. A hopper 14 is disposed relative to assembly 12 for orienting separated parts received from the assembly 12, with the latter being arranged centrally of and within the hopper 14. A vibratory feeder drive unit 16, of basically conventional design, is connected to hopper 14 for imparting vibrations thereto.

Figure 3:
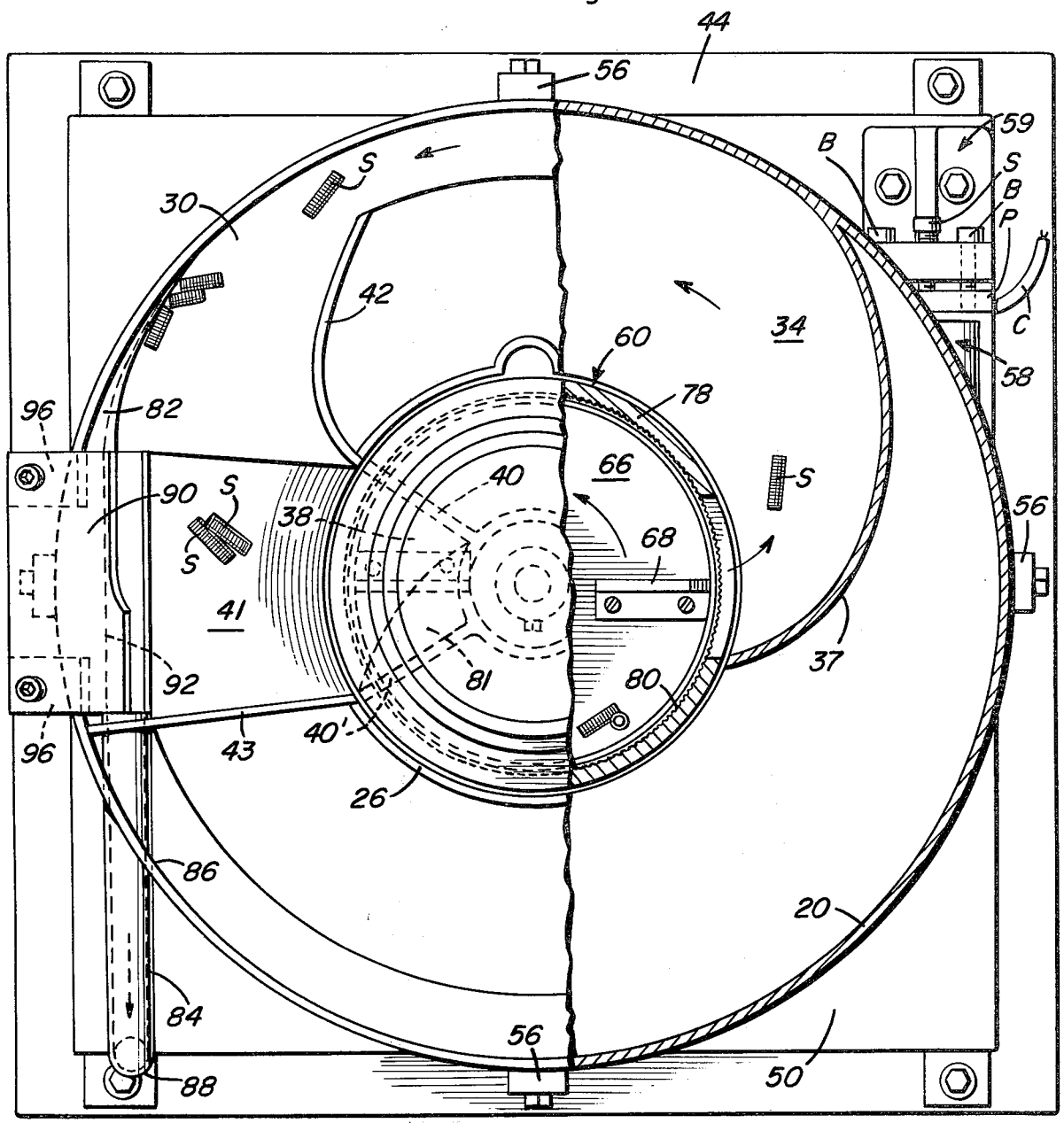
FIG. 3 is a top plan, partly sectional view taken generally along the line 3—3 in FIG. 2.

Referring now more particularly to FIGS. 2 and 3 of the drawings, hopper 14 is formed by an annular bowl 18 which has an outer wall 20 and a bottom 22. The latter is provided with a central opening 24. The hopper 14 further includes an inner wall 26 arranged around and spaced from opening 24, with the outer wall 20 and inner wall 26 extending codirectionally from bottom 22. Separator assembly 12 includes a separator unit 28 arranged in central opening 24 of bottom 22 of the bowl 18. As can be appreciated by those skilled in the art, bowl 18 is of basically conventional construction except for the provision of opening 24 and inner wall 26.

Figure 7:
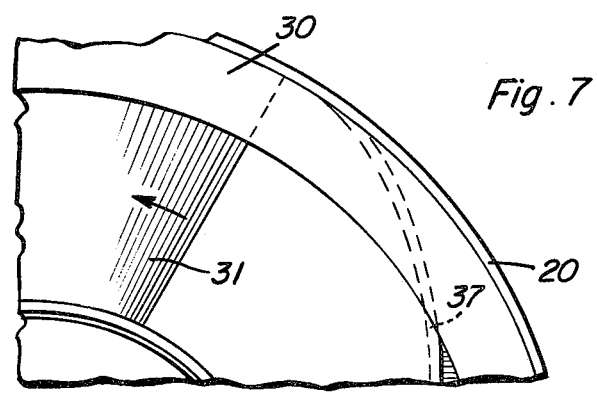
FIG. 7 is a fragmentary, top plan view showing a portion of the track of the vibratory feeder bowl according to the present invention.

Bowl 18 further includes a spiral track 30 as is basically conventional and extends toward, and supports, inner wall 26 of bowl 18 from outer wall 20 thereof. Slightly more than one spiral 31 of track 30 helps form a portion 32 of track 30 adjacent bottom 22 of bowl 18 and extending from outer wall 20 to inner wall 26. This spiral 31, as mentioned above, spirals slightly more than one revolution around bowl 18 and forms a pocket 34 (FIG. 2). Separator unit 28 has a discharge port 36 disposed in communication with pocket 34 for decelerating parts emitted from the separator unit 28 without the parts striking parts already in bowl 22 and becoming entangled with one another again. Further, it will be appreciated from FIGS. 2, 3, and 7 that spiral 31 cooperates with a baffle 37 to form a bottom surface of bowl 18 as well as pocket 34.

Separator unit 28 includes an intake port 38 spaced from the discharge port 36 of separator unit 28, and the latter further includes a motor mount portion 39 provided with diverging, substantially vertical walls 40, 40' aligned with intake port 38 of separator unit 28. Portion 39 and intake port 38 form a chute which guides the passage of articles into separator unit 28. A depressed ramp 41 extends to portion 39 from a terminal end of track 30 spaced from the bottom 22 of bowl 18, with track 30 forming a transition to portion 39. A rail 42 is arranged extending from the point of transition of track 30 to wall 40 of portion 39 for preventing articles from falling back into bowl 18. A lip 43 is advantageously associated with ramp 41 for forming a barrier which prevents the springs and similar parts from proceeding off ramp 41 in the direction of movement of the parts along track 30 and guiding the parts into the chute formed by portion 39 so that the parts will fall downwardly along the chute, specifically formed by walls, 40, 40' through port 38, and into separator unit 28.

Figure 4:
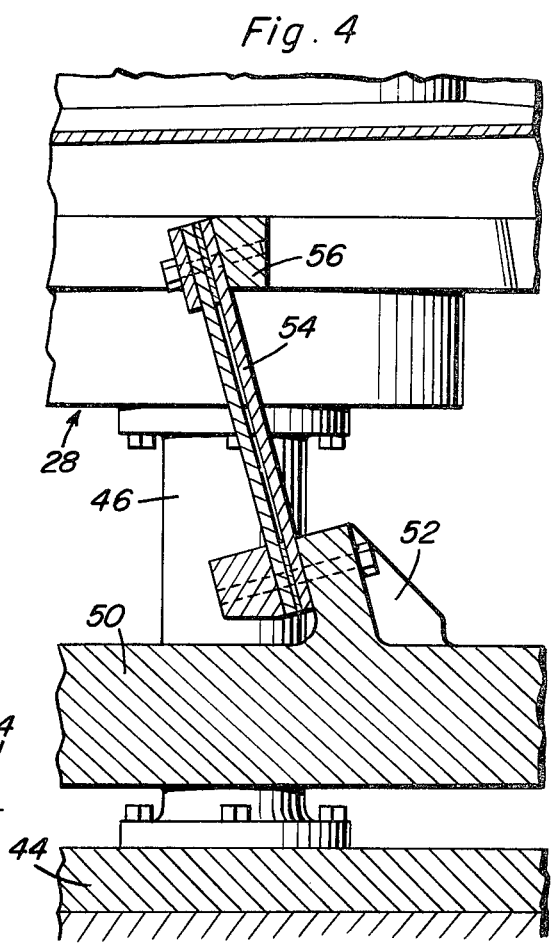
FIG. 4 is a fragmentary, sectional view taken generally along the line 4—4 in FIG. 1.
Figure 5:
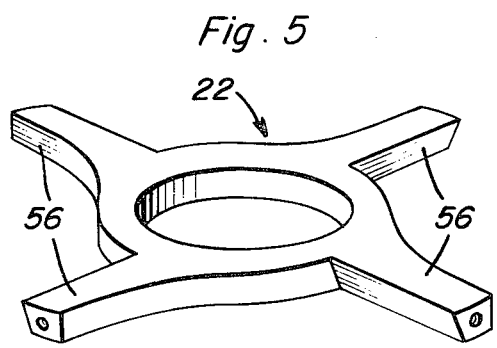
FIG. 5 is a perspective view showing a modified element of the drive unit for an apparatus according to the present invention.
Figure 6:
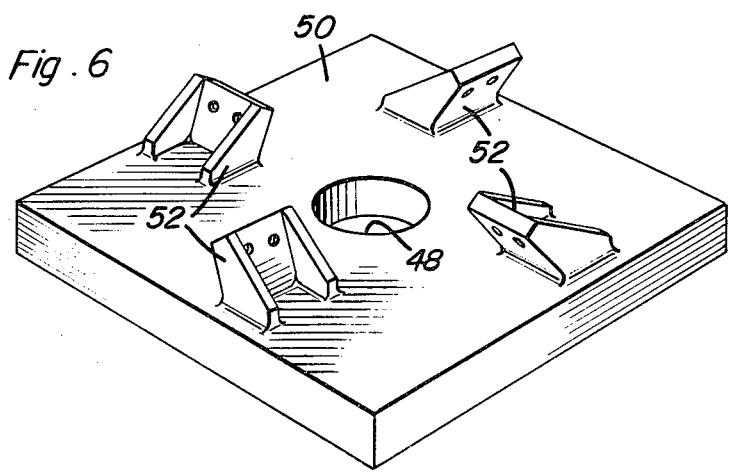
FIG. 6 is a perspective view showing another modified element of a drive unit for apparatus according to the present invention.

Looking at FIGS. 4 through 6 of the drawings together with FIGS. 1 through 3, it can be readily seen that drive unit 16 includes a base 44 which may be mounted on a suitable supporting surface as by the illustrated bolts. The separator assembly 12 further includes a support column 46 which is mounted on base 44 substantially centrally thereof as by conventional fasteners, such as the illustrated screw fasteners, and extends upwardly away from base 44 through a hole 48 provided in a conventional counterweight 50 additionally forming drive unit 16. In this manner, support column 46 is able to support separator unit 28 in the opening 24 of the bottom 22 of bowl 18. Counterweight 50 is in turn mounted on base 44 as by the illustrated rubber mounting feet 51, and the like. These mounting feet 51 are advantageously a predetermined thickness of a suitable resilient material, such as natural or synthetic rubber, molded and bonded between a pair of plates, constructed from steel or other suitable metal. The uppermost surface of counterweight 50 is provided with a plurality of brackets 52, four such brackets being shown, to which one end of leaf springs 54 may be anchored. Bottom 22 of bowl 38 is advantageously in the form of the spider best seen in FIG. 5 and provided with the central opening 24 and having radially extending arms 56 connected to the ends of leaf springs 54 spaced from brackets 52. A conventional electric coil or motor 58 (FIG. 1), which can be encapsulated in a semi-rigid epoxy, is advantageously mounted on counterweight 50 as by the illustrated L bracket 59 (FIG. 1) and contacts one of the arms 56 for imparting a vibratory motion to the arm and to the spring 54 associated with the arm. In this manner, a predetermined vibratory motion is set up in drive unit 16, and this motion is transmitted via bottom 22 to track 30 of hopper 14. When the coil is encapsulated, the power cord C can be connected to the coil within the, for example, epoxy for a safe and economical assembly.

The coil or motor 58 is shown in FIGS. 1 and 3 as mounted for adjustment even while the unit is running. A pair of bolts B go through bracket 59 and screw in a plate P welded to the "E" of the coil, while screws S are screwed through bracket 59 and push against plate P. In this manner, economical and accurate adjustment of the air gap between the "E" of the coil 58 and the "I" mounted on bottom 22 is obtained for controlling the vibrations imparted to the bowl 18.

Referring again to FIGS. 2 and 3 of the drawings, separator unit 28, which is advantageously constructed in accordance with the separator disclosed in my copending application Ser. No. 506,899, filed Sept. 17, 1974, advantageously includes a housing 60 provided with intake ports 38 arranged for facilitating feeding of tangled parts, such as the springs S, into housing 60. A striker assembly 62 is arranged in housing 60 for imparting energy to the parts received in the housing, while a traction surface 64 is provided on a wall of housing 60 for promoting a spinning action of parts energized by assembly 62.

Striker assembly 62 advantageously includes a disc 66 rotatably mounted in housing 60 for substantially covering an associated wall of the housing. A plurality of blades 68 are shown as mounted on disc 66 for rotation therewith. Disc 66 is self-mounted on a shaft 70 of a motor 72, which may be a conventional electric motor or a fluid motor as are commonly used for such purposes, so that rotation of shaft 70 will rotate disc 66. Motor 72 is mounted on top of unit 28. Desirably, housing 60 has a pair of opposed walls 74 and 76, with disc 66 being arranged adjacent to and covering wall 76 for preventing parts from being jammed between blades 68 and housing 60. Blades 68 extend into housing 60 toward wall 74 and its associated aperture which permits passage of shaft 70 of motor 72 into the housing.

FIG. 3 shows a groove 77 provided in wall 26 and extending into bowl 18 for permitting the power cord (not shown) for motor 72 to pass down outside separator unit 28 and out of the assembly with cord C, making for a neater device.

Desirably, housing 60 is the illustrated hollow cylinder having a cylindrical wall 78, with the opposed walls 74 and 76 being the end walls of the cylinder. Wall 74 is also the base plate of portion 39, which is the top portion of unit 28. The traction surface 64 is in this instance formed by a plurality of protuberances 80 (FIG. 3) provided on an inner surface of the cylindrical wall 78. These protuberances 80 extend into housing 60 for facilitating rotation of tangled parts one out of the other. While the inner surface of cylindrical wall 78 is illustrated as provided with a plurality of protuberances 80 which may be formed by knurling, and the like, it is to be understood that other friction increasing surfaces may be employed, such as a surface formed by a resilient material (not shown) bonded to wall 78 to form the traction surface.

As perhaps can best be seen from FIG. 2 of the drawings, discharge port 36 and intake port 38 are advantageously formed in diametrically opposed portions of wall 78 adjacent end wall 74. The pointed projection 81 provided on portion 39 between walls 40, 40' extends downwardly into port 38, provided in wall 74, for deflecting articles away from port 38 and preventing articles from returning to ramp 41.

As can best be seen from FIGS. 2 and 3 of the drawings, the uppermost end portion of track 30 has associated therewith a guide 82 which facilitates guiding of parts S separated and oriented into the inlet end of a tube 84 arranged passing out of outer wall 20 of bowl 18 through an opening 86 provided in such wall. The separated and oriented parts may now pass, for example, down a chute 88 into a receiving receptacle (not shown) or to an automatic handling device (not shown).

Referring once again to FIGS. 2 and 3 of the drawings, the area used for selecting single springs for the output tube 84 is illustrated as being formed by three plates 90, 92, and 94 very accurately spaced as by a pair of blocks 96 so as to cam off the tangled and double springs back into separator unit 28. The top and bottom blades or plates 90 and 94 may be spaced, for example, about 0.005 inch over the diameter of springs S, while the top blade or plate 90 is advantageously provided with the cam surface which is best seen in FIG. 2. The latter is provided to cam off any "doubles" or springs S rolled together as is shown on ramp 41 in FIG. 3. Further, the springs S must pass under the top plate 90 and roll against the thin blade or plate 92 arranged under and abutting the top plate 90. This thin plate 92 is adjusted to allow single springs S to ride on the edge of lower plate 94 and cause the doubles to fall off the selector device formed by the plates 90, 92, and 94. Spacers 96 are used, one on each of the illustrated bolts, for example, to adjust the spacing of the plates 90, 92, and 94.

As will be appreciated from the above description and from the drawings, the springs and like parts will free fall down between walls 40, 40' and pass through port 38 onto striker assembly 62 of separator unit 28. The impact of blades 68 of striker assembly 62 on the springs will set up natural vibrations or oscillations in the tangled parts that, due to the contact angle along the radius of the spring wire, drives the springs and like parts apart. The same separating forces are transferred to tangled parts by propelling them against a solid object. Further, the striking force, or energy, imparted to the tangled parts sets up a rotating motion of the parts on an axis parallel to or at the center of the radius of the coils of the parts. This rotating motion of the parts rotates one out of the other. Traction surface 64 facilitates the creation of the necessary spinning action desired to cause the springs to thus separate. The separated parts are then flipped out of housing 60 of separator unit 28 by reason of the force being imparted to the spring and like parts by the striker assembly 62, and fall into pocket 34 whence they will be fed by reason of the vibratory feeding action of hopper 14 upwardly along the spiral track 30 to ramp 42. Once the parts reach the uppermost end of track 30, those parts that have been properly separated and oriented will pass through tube 84 and out of the apparatus. But, those parts which have either not been separated by separator unit 28, or are not properly oriented on track 30, will be returned to separator unit 28 via ramp 42, portion 39, and intake port 38. Another advantageous feature of the construction of the separator unit 28 is that the rotating blades result in the striking surface of the blades to be constantly changing and thus changing the force, or energy, delivered to the parts. The result of this construction is that breakage of the parts being separated may be advantageously controlled.

The split bottom of track 30 may be visualized as a large lock washer with the ends thereof overlapped. Thus, as can be readily understood, the use of this "lock washer" construction in conjunction with baffle 37 forms an area or pocket 34 which allows the springs and like parts coming out of separator unit 28 to decelerate without striking other springs and other parts in the bottom of hopper 14 and becoming entangled again. From the split bottom, the springs and like parts travel up the spiral track 30 to the tube 84 selector, where if more than one spring tries to travel across the arcuate guide 82 they will fall off of track 30 onto ramp 42 and back into the separating unit 28. Further, it will be appreciated that when discharge tube 84 is full of parts and cannot accept any more parts, then all of the oncoming parts passing up the spiral track 30 will fall back into the separator unit.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for receiving articles such as springs and spring-like parts in bulk and in unoriented and tangled condition and untangling and orienting same, the apparatus comprising, in combination:

a. a parts separator assembly arranged for receiving tangled articles and separating same;
b. a hopper arranged for orienting separated parts received from the separator assembly, the separator assembly being arranged centrally of and within the hopper; and
c. a vibratory feeder drive unit connected to the hopper for imparting vibrations to the hopper and feeding parts received from the separator assembly; the hopper is an annular bowl which includes an outer wall and a bottom, the latter being provided with a central opening, and further including an inner wall arranged around and spaced from the opening, the outer and inner walls extending codirectionally from the bottom, the separator assembly including a separator unit arranged in the central opening of the bottom of the bowl, and the bowl further includes a spiral track extending toward the inner wall of the bowl from the outer wall of the bowl, a portion of the track adjacent the bottom of the bowl extending from the outer wall to the inner wall and spiralling more than one revolution around the bowl and forming a pocket, and the separator unit having a discharge port disposed in communication with the pocket for decelerating parts emitted from the separator unit without the parts striking parts already in the bowl and becoming entangled again.

2. Apparatus as defined in claim 1, wherein the separator unit has an intake port spaced from the discharge port thereof, and further includes a top portion provided with diverging walls aligned with the intake port of the separator unit, and a ramp extending to the diverging walls of the top portion from a terminal end of the track spaced farthest from the bottom of the bowl.

3. Apparatus as defined in claim 2, wherein the bottom of the bowl is a spider provided with the central opening and having radially extending arms connected to the drive unit, the outer wall of the bowl being connected to the arms of the spider.

4. Apparatus as defined in claim 3, wherein the drive unit includes a base, and the separator assembly includes a support column mounted on the base and arranged extending centrally through the drive unit for supporting the separator unit in the central opening of the bottom of the bowl.

5. Apparatus as defined in claim 4, wherein the separator unit includes: a housing provided with an inlet port for feeding tangled parts into the housing; striker means arranged in the housing for imparting energy to the parts; and traction means provided in the housing for promoting a spinning action of parts energized by the striker means.

6. A structure as defined in claim 5, wherein the housing is a hollow cylinder having a cylindrical wall and a pair of opposed end walls, the striker means including a disc rotatably mounted and arranged for substantially covering an associated wall of the housing, and at least one blade mounted on the disc for rotation therewith, the disc being arranged adjacent to as well as covering one of the opposed end walls for preventing parts from being jammed between the blade and the housing, the blade extending into the housing toward the other of the opposed end walls, and the traction means including an inner surface of the cylindrical wall forming a traction surface for facilitating rotation of tangled parts one out of the other, the intake and discharge ports of the separator unit being provided in diametrically opposed portions of the cylindrical wall adjacent the other of the end walls.

7. Apparatus as defined in claim 6, wherein the hopper includes a selector comprising three plates, the first plate and a second thin plate arranged abutting one another and forming a top region of the selector and the third plate forming the lower region of the selector and being spaced from the first and second plates a variable distance predetermined by the size of the articles being separated, and a spacing block arranged between the first and second plates and the third plate for adjustably spacing the two sets of plates from one another.

8. Apparatus as defined in claim 7, wherein tthe vibratory feeder drive unit includes adjustment means for controlling the vibrations imparted to the hopper.

9. Apparatus for receiving articles such as springs and spring-like parts in bulk and in unoriented and tangled condition and untangling and orienting same, the apparatus comprising, in combination:
a. a parts separator assembly arranged for receiving tangled articles and separating same;
b. a hopper arranged for orienting separated parts received from the separator assembly, the separator assembly being arranged centrally of and within the hopper; and
c. a vibratory feeder drive unit connected to the hopper for imparting vibrations to the hopper and feeding parts received from the separator assembly; and the separator unit includes: a housing provided with an inlet port for feeding tangled parts into the housing; striker means arranged in the housing for imparting energy to the parts; and traction means provided in the housing for promoting a spinning action of parts energized by the striker means.

10. Apparatus for receiving articles such as springs and spring-like parts in bulk and in unoriented and tangled condition and untangling and orienting same, the apparatus comprising, in combination:
a. a parts separator assembly arranged for receiving tangled articles and separating same;
b. a hopper arranged for orienting separated parts received from the separator assembly, the separator assembly being arranged centrally of and within the hopper; and
c. a vibratory feeder drive unit connected to the hopper for imparting vibrations to the hopper and feeding parts received from the separator assembly; and the hopper includes a selector comprising three plates, the first plate and a second thin plate arranged abutting one another and forming a top region of the selector and the third plate forming the lower region of the selector and being spaced from the first and second plates a variable distance predetermined by the size of the articles being separated, and a spacing block arranged between the first and second plates and the third plate for adjustably spacing the two sets of plates from one another.

* * * * *